United States Patent Office.

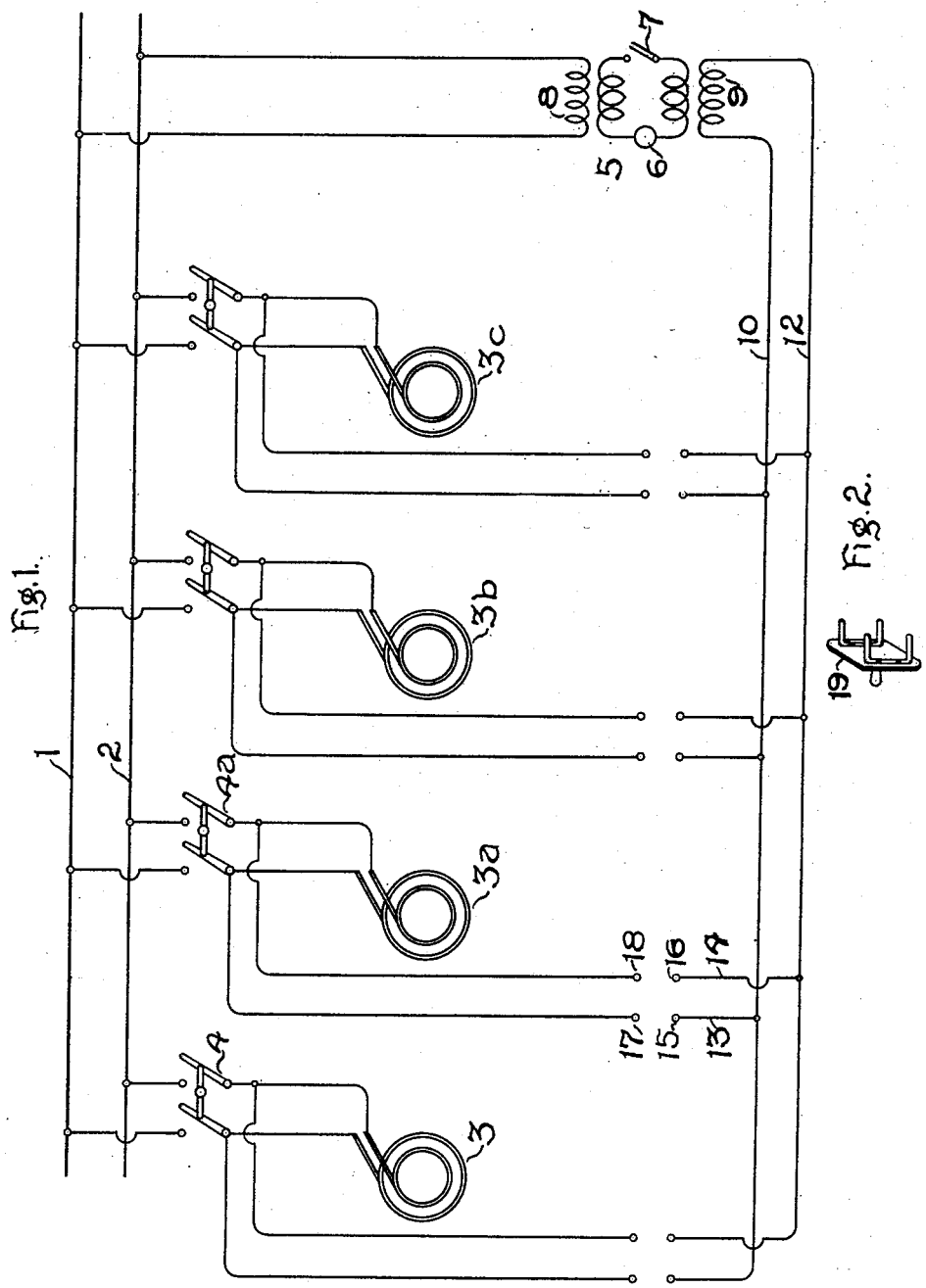

SAMUEL W. MAUGER, OF SCHENECTADY, NEW YORK, ASSIGNOR TO THE GENERAL ELECTRIC COMPANY, A CORPORATION OF NEW YORK.

SYNCHRONIZING APPARATUS FOR ALTERNATORS.

SPECIFICATION forming part of Letters Patent No. 717,234, dated December 30, 1902.

Application filed June 8, 1900. Serial No. 19,553. (No model.)

*To all whom it may concern:*

Be it known that I, SAMUEL W. MAUGER, a citizen of the United States, residing at Schenectady, county of Schenectady, State of New York, have made certain new and useful Improvements in Synchronizing Apparatus for Alternators, (Case No. 1,380,) of which the following is a specification.

In operating alternating-current dynamo-electric machines in parallel it becomes necessary in distributing the current from a distributing-station, before cutting in an auxiliary machine when the necessities of the system require an auxiliary source of current-supply, to close its circuit when the phases of the current it generates are synchronous with the phases of the machine or machines already connected in circuit.

In order to determine the proper moment of closing the switch, it is usual to provide some indicating device for synchronism which may be operated jointly by the machines already cut in and the machine about to be cut in. It is the object of my invention to accomplish this result by means more simple than those commonly adopted.

In carrying out my invention I provide a single synchronism or phase indicator common to all the machines of a station and provide means for connecting it into operative relation to any pair of machines or to any machine and all of the others by a single control-circuit leading from the phase-indicator to the several machines. I prefer to employ as a phase-indicator a voltmeter or an incandescent electric lamp inductively related through the secondary of transforming apparatus to the bus-bars common to all the machines and to the terminals of any machine in the station. In the case of an incandescent lamp the terminals may be selected so as to bring the phases when the machines are in synchronism into conjunction or opposition, synchronism being indicated by the brilliancy or the darkness of the lamp. By my system I greatly economize wiring and permit a single indicator to act for all of the machines.

My system also furnishes great flexibility by extending the capacity of the synchronizing system, an increase in the size of the plant being accommodated by the extension of the single control-circuit.

The novel features will be hereinafter more specifically pointed out and will be definitely indicated in the claims annexed to this specification.

In the accompanying drawings, which show diagrammatically a system embodying my improvements, Figure 1 shows the circuit arrangement of the station and the phase-indicator, and Fig. 2 is a perspective view of a four-point switch adapted to connect any machine with the phase-indicator.

1 and 2 represent the distributing bus-bars of a switchboard supplied by a bank of alternating-current dynamo-electric machines 3 $3^a$ $3^b$ $3^c$. As many of these may be employed as are necessary for the current to be supplied. Each machine is provided with a switch 4 $4^a$, &c., for connecting up the machines. In order to prevent one machine from acting as a motor, it is necessary that it be thrown upon the bus-bars at the precise moment when its phases are synchronous with those of the machine already connected with the bus-bars. To determine the proper time for throwing the switch, I provide a phase-indicator, (indicated diagrammatically at 5,) comprising a secondary circuit including a lamp or voltmeter 6 and a controlling-switch 7, said secondary circuit being inductively related to primary circuits 8 and 9. The former is directly connected with the bus-bars and the latter connected to a pair of synchronizing-wires 10 12, extending along the switchboard and provided at each panel with a circuit-closer for coupling it with the terminals of the machine corresponding to that panel. I prefer to employ a four-point switch, and for each machine I lead off two wires—as, for example, 13 14—terminating in socket-contacts 15 16, opposite which are a pair of auxiliary socket-contacts 17 18, connecting by leads with the terminals of the machine corresponding to the panel on which the contacts are located. These contacts 15 17 16 18 may be bridged by a four-point switch 19, (see Fig. 2,) so as to connect the alternator corresponding to the panel with the synchronizing-wires 10 12. I prefer to adjust the secondaries of the transformers feeding the phase-indicator so as to deliver when the phases coöperate two hundred and twenty volts, thereby permitting a lamp with a fine filament to be employed as a synchronizing device. This being quickly responsive to changes of current forms a more sensitive indicator than a lamp having a coarser filament would. Thus so long as any machines are operating the phase-indicator may be supplied with current by closing the hand-operated switch 7, and then by inserting the four-point switch 19 in the sockets of the panel corresponding to the machine it is desired to cut in the lamp burns under a voltage varying with the approximation to synchronism of the machine already on the bus-bars and the one which is being cut in.

If the connections are made for a bright test when synchronism is effected, the lamp flashes out brilliantly, and the switch—say 4ª—corresponding to the machine being cut in is thrown. By reversing the connections of one of the secondaries the lamp may be made to indicate synchronism when its light is extenguished, thereby affording a dark test.

What I claim as new, and desire to secure by Letters Patent of the United States, is—

1. Means for synchronizing alternators, comprising two primary circuits, means for connecting them with the bus-bars and each of three or more machines respectively, and a common secondary circuit including phase-indicating devices.

2. Means for synchronizing alternating-current machines comprising a synchronizing-circuit, circuit-controllers for three or more machines in parallel relation to said circuit, a transformer having a primary winding charged jointly by the synchronizing-circuit and a branch from the bus-bars, and a phase-indicator in the secondary of said transformer.

In witness whereof I have hereunto set my hand this 5th day of June, 1900.

SAMUEL W. MAUGER.

Witnesses:
BENJAMIN B. HULL,
MABEL H. EMERSON.